(12) United States Patent
Synnergren

(10) Patent No.: US 8,111,720 B2
(45) Date of Patent: Feb. 7, 2012

(54) METHOD AND APPARATUS TO INDICATE MAXIMUM SCHEDULING DELAY FOR JITTER BUFFER IMPLEMENTATIONS

(75) Inventor: Per Synnergren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1092 days.

(21) Appl. No.: 11/953,094

(22) Filed: Dec. 10, 2007

(65) Prior Publication Data

US 2008/0165766 A1 Jul. 10, 2008

Related U.S. Application Data

(60) Provisional application No. 60/879,358, filed on Jan. 9, 2007.

(51) Int. Cl.
*H04J 3/06* (2006.01)

(52) U.S. Cl. ......... 370/517; 370/412; 370/415; 370/516

(58) Field of Classification Search ........................ None
See application file for complete search history.

(56) References Cited

U.S. PATENT DOCUMENTS

| | | | |
|---|---|---|---|
| 7,027,456 B1* | 4/2006 | Chen | 370/412 |
| 7,088,697 B1 | 8/2006 | Benz et al. | |
| 7,324,444 B1* | 1/2008 | Liang et al. | 370/230 |
| 2002/0101885 A1* | 8/2002 | Pogrebinsky et al. | 370/516 |
| 2003/0031210 A1* | 2/2003 | Harris | 370/516 |
| 2003/0123466 A1* | 7/2003 | Somekh et al. | 370/401 |
| 2004/0062233 A1* | 4/2004 | Brown | 370/352 |
| 2006/0045138 A1* | 3/2006 | Black et al. | 370/516 |
| 2006/0088000 A1 | 4/2006 | Hannu et al. | |
| 2006/0203807 A1* | 9/2006 | Kouretas et al. | 370/352 |
| 2007/0036180 A1* | 2/2007 | Shenoi | 370/516 |
| 2008/0049795 A1* | 2/2008 | Lakaniemi | 370/516 |
| 2010/0149976 A1* | 6/2010 | Lee | 370/231 |

OTHER PUBLICATIONS

International Search Report for International Application No. PCT/SE2007/050993, mailed Jun. 9, 2008 (5 pages).
3GPP TSG SA WG4 MTSI Ad-hoc Meeting #1, Jun. 27-29, 2006, Kista, Sweden, "Proposal for Jitter Functional Specification for MTSI Terminals", Tdoc S4-AHM011, http://isearch.etsi.org/3GPPSearch/isysquery/a96c607a-3389-47e1- acfd-1b12499a85dc/1/doc/sub/S4-AHM011%20-%20PROPOSAL%20FOR%20JITTER% 20BUFFER%20FUNCTIONAL%20SPECIFICATION% 20FOR%20MTSI% 20TERMINALS.DOC (2 pages).

(Continued)

*Primary Examiner* — Donald Mills
(74) *Attorney, Agent, or Firm* — Nixon & Vanderhye P.C.

(57) ABSTRACT

In VoIP systems, there is a tradeoff between reducing number of lost packets and end-to-end delay when dealing with jitters. Increasing the jitter buffer space on a mobile wireless terminal reduces the likelihood of lost packets but increases the end-to-end delay. Decreasing the jitter buffer space shortens the end-to-end delay, but there is a greater likelihood of retransmissions and dropped packets. Optimum solution can be arrived at if the jitter buffer space on the mobile wireless terminal can be matched to the scheduling delay. This is difficult to achieve in conventional system because the scheduling delay introduced by the network is unknown to the mobile wireless terminal. Thus, constant adjustment is required. One way to overcome this problem is to apprise the mobile wireless terminal of the maximum scheduling delay.

36 Claims, 13 Drawing Sheets

OTHER PUBLICATIONS

3GPP TS 26.114,V1.2.0, Dec. 13, 2006, 3rd Generation Partnership Project; Technical Specification Group Services and System Aspects IP Multimedia Subsystem (IMS); Multimedia Telephony; Media handling and interaction (Release 7) TSG-SA4 internal working draft, http://www.#gpp.org/ftp/Specs/html-info/26114.htm (77 pages).

3GPP TSG SA WG4 #39, May 15-19, 2006, Dallas, USA, "Minimum performance requirements for speech jitter handling in IMS Multimedia Telephony", Tdoc S4 (06) 0244, http://isearch.etsi.org/3GPPSearch/isysquery/3bb88a7b-4da6-444b-abe4-9d17d65afa08/1/doc/sub/S4-060244%20-%20MINMUM%20PERFORMANCE%20REQUIREMENTS%20FOR%20SPEECH%20JITTER%20 HANDLING.DOC (10 pages).

3GPP TR 26.914, V7.0.0, Mar. 2006, 3rd Generation Partnership Project; Technical Specification Group Services and System Aspects; Multimedia telephony over IP Multimedia Subsystem (IMS); Optimization opportunities (Release 7), http://www.3gpp.org/ftp/specs/html-info/26914/htm (17 pages).

3GPP TSG-RAN WG2 Meeting #61, Feb. 11-15, 2008, Sorrento, Italy, "Delivery of Maximum Jitter timer Information to UE", R2-080799, http://isearch.etsi.org/3GPPSearch/isysquery/04ee8772-847b-4c25-8274-c59eca264172/1/doc/sub/sub/MAX%20JITTER%20TIMER).DOC (1 page).

3GPP TSG-RAN WG2 Meeting #60bis, Jan. 14-18, 2008, Sevilla, Spain, "Delay and loss rate for CS over HSPA", R2-080292, http://www.quintillion.co.jp/3GPP/TSG_RAN/TSG_RAN2008/TSG_RAN_WG2_RL_1.html (4 pages).

* cited by examiner

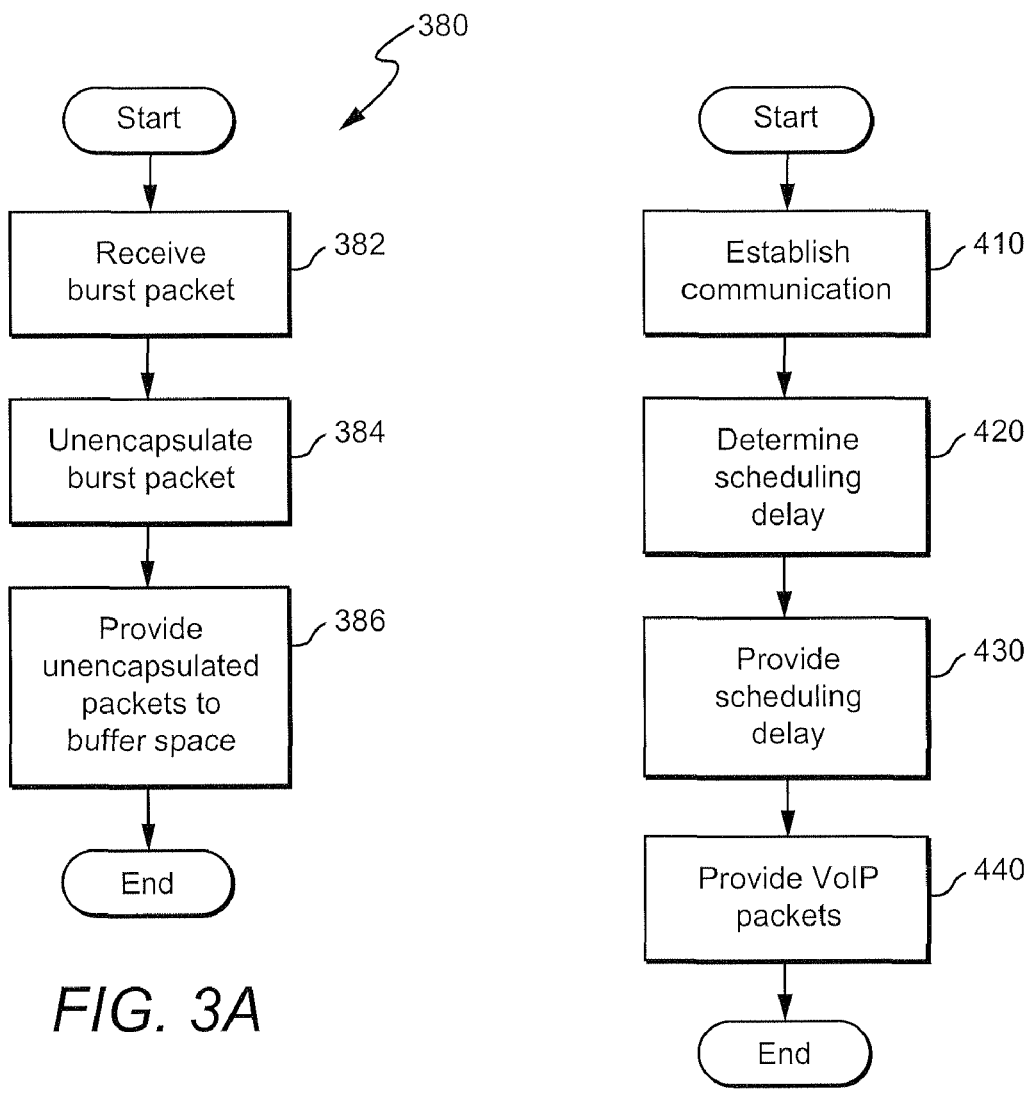

*FIG. 13*
CONVENTIONAL
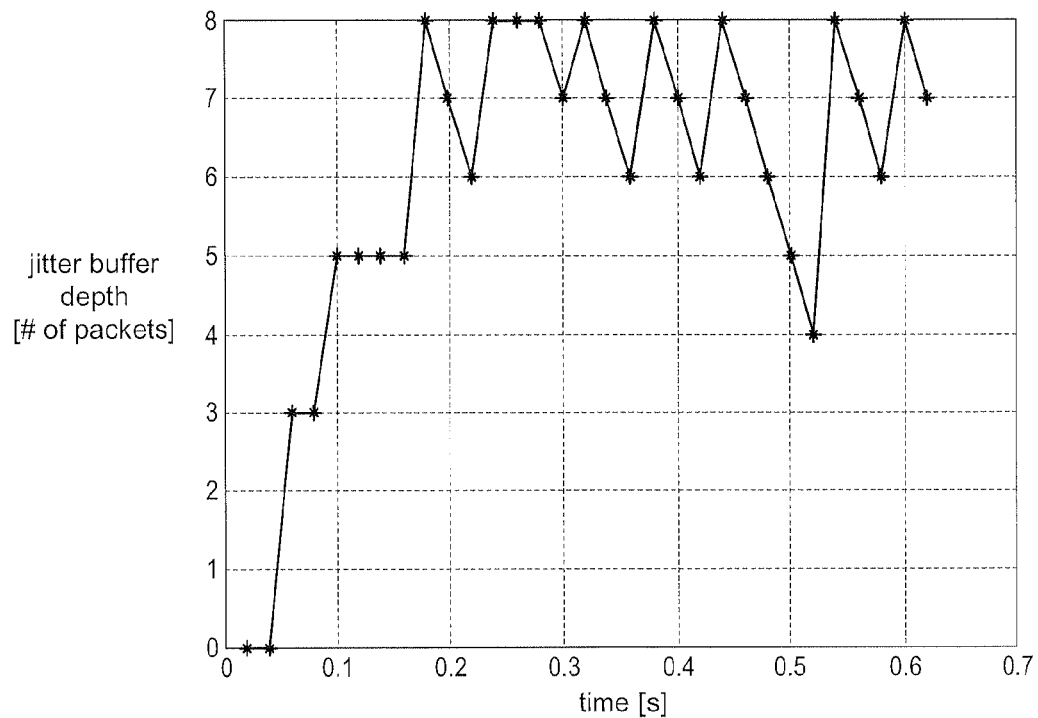

METHOD AND APPARATUS TO INDICATE MAXIMUM SCHEDULING DELAY FOR JITTER BUFFER IMPLEMENTATIONS

RELATED APPLICATION

This application claims priority to the provisional application 60/879,358 entitled "METHOD AND APPARATUS TO INDICATE MAXIMUM SCHEDULING DELAY IN ORDER TO HELP JITTER BUFFER IMPLEMENTATIONS" filed on Jan. 9, 2007, the content of which is hereby incorporated by reference in its entirety.

TECHNICAL FIELD

The technical field of this disclosure generally relates to scheduling delays for jitter buffer implementations in mobile broadband networks. More specifically, the disclosure relates to indicating maximum scheduling delays for jitter buffer implementations so that end-to-end delays are minimized while maintaining overall performance of the mobile broadband network.

BACKGROUND

Currently, VoIP (Voice over Internet Protocol) over a mobile broadband network such as the High Speed Packet Access (HSPA), Long Term Evolution (LTE), Enhanced Data Rates for GSM Evolution (EDGE) or EDGE Continued Evolution has been given much attention. The main reason for choosing these mobile broadband networks, over other radio bearer realizations is flexibility. This flexibility promises easy introduction of new media streams as a complement to the voice stream.

However, flexible scheduling in these mobile broadband networks raises concern that the performance of the VoIP service will be negatively influenced by significant amounts of jitter. Jitter can be viewed as a variation of packet transit delay caused by queuing contention, and serialization effects on the path through the network.

One way to handle the jitter is to introduce a jitter buffer. The jitter buffer helps to remove the effects of jitter when decoding the voice stream, buffering each arriving VoIP packet for a short interval before playing it out. The jitter buffer can be considered as a time window with one side (the early side) aligned with a minimum possible delay and the other side (the late side) representing a maximum possible delay before a packet would be discarded. A concern of the jitter buffer is that the end-to-end delay of the VoIP service will be significantly longer than for a commercial CS (circuit switched) telephony system.

In Voice over HSPA systems and Voice over LTE systems, the main part of the jitter is introduced by the packet scheduler and the fast retransmission mechanism between the base station and the mobile terminals called the H-ARQ. The scheduler, depending on implementation and load conditions, can decide to send one packet to the receiver as soon as it arrives to the scheduler or wait and possibly send several packets in one transmission to the receiver which introduces jitter. Due to the real-time characteristics of VoIP, the scheduler for VoIP should not wait to long. Typically, a maximum scheduling delay threshold is implemented in the scheduler and packets older than the maximum threshold are discarded. The H-ARQ retransmits the packets (one or several) until either the receiving entity successfully can decode the received information or until the maximum retransmission delay threshold is passed, leading to the packet being discarded.

Voice over EDGE has also gained interest since many operators have a mixture of WCDMA (Wide Band Code Division Multiple Access) and GSM (Global System for Mobile communications) networks. Like GSM, EDGE has time-sharing and scheduled access. In the EDGE Continued Evolution, non-persistent scheduling is a possibility. As for the H-ARQ mechanisms in the HSPA and LTE, this implies that a VoIP packet will be retransmitted only a few times at most before it is discarded. This increases the probability of transmission, but also raises concerns that the performance of the VoIP over EDGE will be negatively influenced by significant amounts of jitter.

To illustrate this problem, a VoIP over HSPA example is shown in FIG. 7. FIG. 7 presents a calculation of an end-to-end delay in a VoIP over HSPA network. From FIG. 7, a conclusion can be drawn that the end-to-end delay may vary between 134 ms and 229 ms in this particular instance. Thus, the jitter buffer 220 should be 229−134=95 ms long. This corresponds to the difference between the minimum scheduling delay of the DL (downlink) transmission, i.e. from the network to the mobile UE (user equipment), and the maximum scheduling delay of the DL. However, in conventional systems, the knowledge about the maximum scheduling threshold is not known by the UE. The mobile UE is also referred to as a mobile wireless terminal.

SUMMARY

An embodiment of a mobile wireless terminal capable of performing VoIP over mobile broadband is disclosed. The mobile wireless terminal includes a jitter buffer and a terminal controller. The jitter buffer is configured to buffer the VoIP packets from a base station over a radio interface and the terminal controller, which is operatively coupled to the jitter buffer, is configured to allocate an amount of buffer space in the jitter buffer sufficient for a maximum scheduling delay in the jitter buffer. The amount of buffer space allocated in the jitter buffer is in accordance with a maximum scheduling delay indication associated with the mobile wireless terminal. The maximum scheduling delay indication is received from the base station over the radio interface.

The mobile wireless terminal also includes a radio unit and a decode unit. The radio unit is configured to receive the VoIP packets from the base station and serves as the radio interface. The decode unit is operatively coupled to the jitter buffer and is configured to decode the VoIP packets buffered in the jitter buffer. The terminal controller is operatively coupled to the radio unit and the decode unit, and is configured to control operations of the radio unit and the decode unit. The decode unit starts decoding the VoIP packets from the jitter buffer a predetermined time after the communication with the base station is established or once the allocated buffer space is full for the first time after communication with the base station is established. Once started, the decode unit continually decodes the VoIP packets from the jitter buffer without regard to whether or not the allocated buffer space is full.

The maximum scheduling delay indication can be provided explicitly to the mobile wireless terminal from the network via the base station or from the base station itself. As examples, the maximum scheduling delay indication is provided explicitly as an amount of time, such as 95 ms, or an amount of data such as 10 KB. The terminal controller allocates the buffer space in the jitter buffer corresponding to the amount of time or the amount of data that is provided. The maximum scheduling delay indication is received by the mobile wireless terminal prior to receiving the VoIP packets upon establishing communication between the mobile wireless terminal and the base station.

The maximum scheduling delay indication may also be provided implicitly. In an embodiment, the radio unit receives a predetermined packet from the base station. The predetermined packet includes VoIP data. The amount of the VoIP data in the predetermined packet corresponds to the maximum scheduling delay threshold. The terminal controller is configured to allocate the buffer space in the jitter buffer corresponding to the amount of the VoIP data in the predetermined packet.

The predetermined packet can be in a form of an initial burst packet from the base station. One or more VoIP packets are encapsulated in the initial burst packet. The radio interface can unencapsulate the initial burst packet into the constituent one or more VoIP packets and provide the unencapsulated VoIP packets to the jitter buffer. Subsequent to the initial burst packet, other burst packets may be received from the base station where each subsequent burst packet also includes one or more VoIP packets.

An embodiment of a method of reducing jitter for VoIP over mobile broadband is also disclosed. The method includes the acts of receiving, over a radio interface, a maximum scheduling delay indication from the base station, where the maximum scheduling delay indication corresponds to a maximum scheduling delay associated with the mobile wireless terminal. The method also includes the act of allocating an amount of buffer space in the jitter buffer of the mobile wireless terminal sufficient for the maximum scheduling delay.

The method further includes receiving VoIP packets from the base station and storing the VoIP packets in the jitter buffer, determining whether the allocated buffer space is full, and starting the VoIP decoding process when it is determined. The VoIP decoding process starts one the allocated buffer space becomes full for the first time after establishing communication with the base station. After starting the VoIP decoding process, the decoding process continues from then on without regard to whether the allocated buffer space is full.

The maximum scheduling delay indication can be provided explicitly, for example, as an amount of time or an amount of data. The amount of buffer space allocated in the jitter buffer corresponds to the amount of time or the amount of data that is provided. The maximum scheduling delay indication is received prior to receiving VoIP packets.

The maximum scheduling delay indication can also be provided implicitly. The act of receiving the VoIP packets from the base station includes receiving a predetermined packet from the base station. The predetermined packet includes VoIP data packaged therein, and the amount of the VoIP data in the predetermined packet corresponds to the maximum scheduling delay. The allocated buffer space in the jitter buffer corresponds to the amount of the VoIP data in the predetermined packet.

The predetermined packet can in a form of an initial burst packet from the base station. One or more VoIP packets are encapsulated in the initial burst packet and the act of receiving the VoIP packets includes unencapsulating the initial burst packet into the one or more VoIP packets and providing the unencapsulated VoIP packets to allocated buffer space of the jitter buffer. Subsequent to the initial burst packet, other burst packets may be received from the base station where each of the subsequent burst packets also includes one or more VoIP packets.

An embodiment of a base station capable of performing VoIP over mobile broadband is disclosed. The base station includes a base band unit and a base station controller. The base band unit is configured to communicate with a plurality of mobile wireless terminals via a radio interface, and the base station controller is operatively coupled to the base band unit and is configured to control operations of the base band unit. The base station also includes a RF (radio frequency) unit, which serves as the radio interface.

For each mobile wireless terminal, the base band unit is configured to determine a maximum scheduling delay applicable to the mobile wireless terminal, provide a maximum scheduling delay indication corresponding to the maximum scheduling delay to the mobile wireless terminal, and provide the VoIP packets destined for the mobile wireless terminal. The maximum scheduling indication can be explicit specifying an amount of time or an amount of data. The base band unit provides the explicit maximum scheduling delay indication prior to providing the VoIP packets.

The maximum scheduling delay can also be provided implicitly. The base band unit can be configured to package a predetermined packet and provide the predetermined packet to the mobile wireless terminal. The predetermined packet includes VoIP data, where an amount of the VoIP data in the predetermined packet corresponds to the maximum scheduling delay. The predetermined packet can be provided as an initial burst packet. The base band unit is configured to encapsulate one or more VoIP packets into the initial burst packet, and configured to burst the initial burst packet to the mobile wireless terminal prior to providing any other VoIP packets to the mobile wireless terminal.

For the multiple mobile wireless terminals, the VoIP packets to each individual mobile wireless terminal are queued by the base band unit. For each queued VoIP packet, the base band unit determines whether the packet can be delivered to the mobile wireless terminal within the maximum scheduling delay for the mobile wireless terminal based on a priority criteria. If the queued packet can be delivered within the maximum scheduling delay, the packet is scheduled for the delivery. Otherwise, the VoIP packet is discarded. For the packets that are scheduled to be delivered, these VoIP packets can be packaged into a burst data packet by the base band unit and delivered as part of the burst packet to the mobile wireless terminal. All VoIP packets within the burst data packet are delivered within the maximum scheduling delay. The priority for each VoIP destined for the mobile wireless terminal may be based on a subscriber service level associated with the mobile wireless terminal and origination time of the VoIP.

An embodiment of a method 400 of reducing jitter for VoIP over mobile broad band is disclosed. The method includes determining a maximum scheduling delay applicable to the mobile wireless terminal, providing a maximum scheduling delay indication corresponding to the maximum scheduling delay to the mobile wireless terminal via a radio interface, and providing VoIP packets destined for the mobile wireless terminal also via the ratio interface. The maximum scheduling delay indication can be provided explicitly or implicitly. Also, the VoIP packets may be encapsulated into burst packets, where each burst packet includes one or more VoIP packets. The amount of VoIP packets in an initial burst packet can serve as the maximum scheduling delay indication.

Another embodiment of a method of reducing jitter for VoIP over mobile broadband is disclosed. The method includes establishing communication between a base station and a mobile wireless terminal, notifying the mobile wireless terminal—from the base station—of a maximum scheduling delay for VoIP packets associated with the mobile wireless terminal, allocating a jitter buffer space within the mobile wireless terminal corresponding to the maximum scheduling delay, providing a plurality of VoIP packets from the base station to the mobile wireless terminal, buffering the plurality of VoIP packets in the allocated jitter buffer space of the mobile wireless terminal, and starting a decoding process within the mobile wireless terminal to decode the buffer to plurality of VoIP packets when the allocated jitter buffer space is initially full. The maximum scheduling delay may be provided explicitly as one of an amount of time or amount of data.

An alternative embodiment of a method of reducing jitter is disclosed. The method includes preparing an initial burst packet and bursting to the mobile wireless terminal from the base station the initial burst packet prior to providing any other VoIP packets after establishing communication between the base station and the mobile wireless terminal. The initial burst packet has encapsulated therein one or more initial VoIP packets. The amount of VoIP data in the initial burst packet corresponds to a maximum scheduling delay of the mobile wireless terminal. The method also includes providing to the mobile wireless terminal from the base station remainder of the VoIP packets, and decoding the one or more initial VoIP packets and the remainder of the VoIP packets from the mobile wireless terminal. In this instance, unlike other embodiments discussed above, decoding starts as soon as the mobile wireless terminal receives the VoIP data without regard to whether or not a jitter buffer of the mobile wireless terminal is full or not. There is no waiting until the jitter buffer becomes full for the first time after establishing communication.

BRIEF DESCRIPTION OF THE DRAWINGS

The foregoing and other objects, features and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A illustrates an example method to receive burst packets;

FIG. 4 illustrates an example method, performed by a base station, of reducing jitter for VoIP over mobile broadband;

FIG. 13 illustrates an example of the jitter depth as a function of time in a conventional system where the jitter buffer is not optimized.

DETAILED DESCRIPTION

For simplicity and illustrative purposes, the principles of the invention are described by referring mainly to example embodiments thereof. However, one of ordinary skill in the art would readily recognize that similar principles are equally applicable to many types of systems and methods for communication between base stations and mobile wireless terminals. Also, the functional blocks and methods illustrated in the figures may be implemented in a variety of ways including, but not limited to, a software program, DSP, ASIC, etc. Advantageously, end-to-end delay is reduced in a cost effective manner and communication resource utilization is enhanced.

Figure 7:
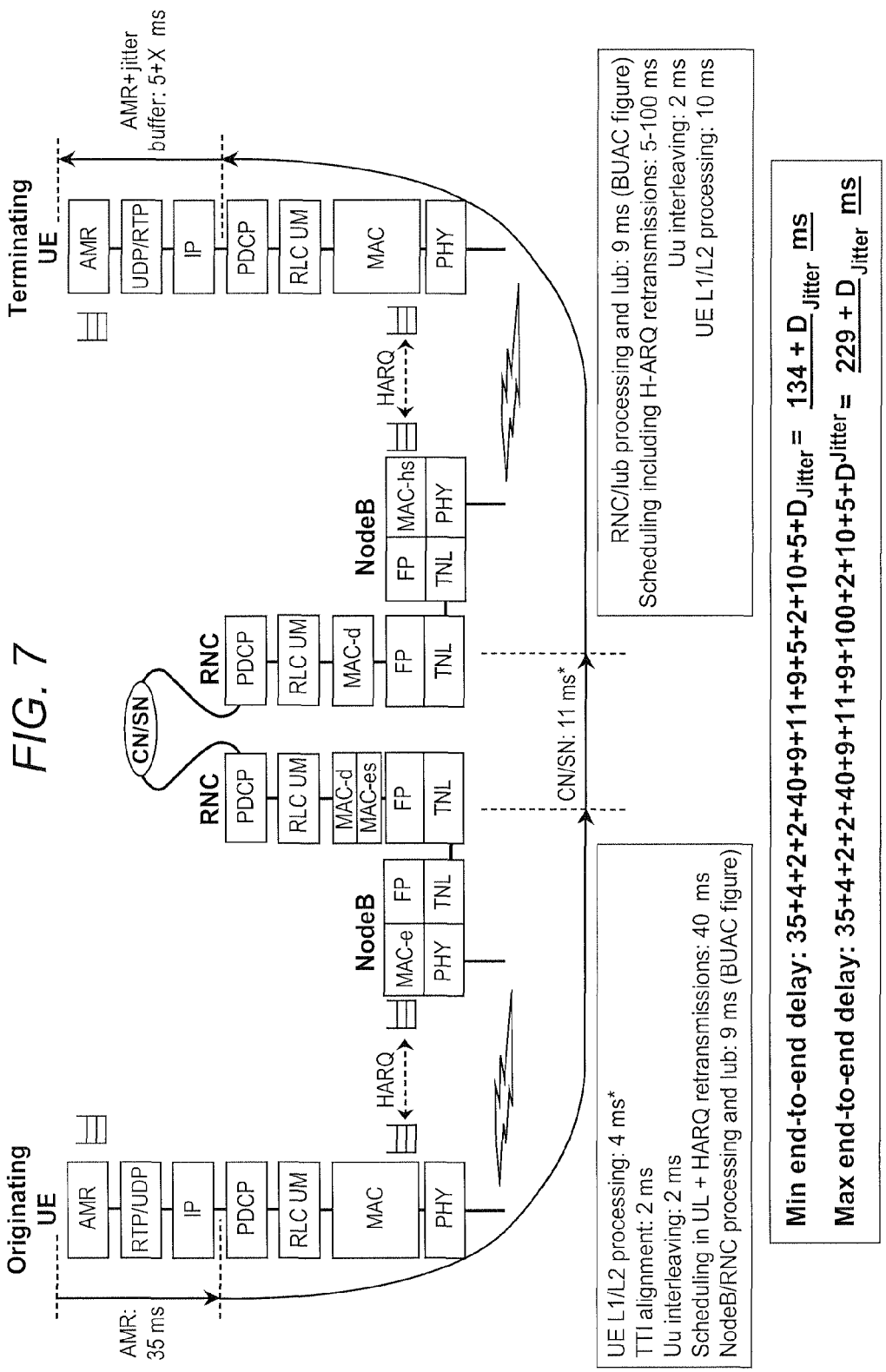
FIG. 7 illustrates an example calculation of end-to-end delay in a VoIP over HSPA system.

To illustrate the jitter problem, FIG. 7, which is an illustration of a calculation of an end-to-end delay in a VoIP over HSPA system, is again referenced. From FIG. 7, one can draw the conclusion that the jitter buffer 220 should be 95 ms (229−134) large. This corresponds to the difference between the minimum scheduling delay of the DL and the maximum scheduling delay of the DL in the Figure. In the example system, the scheduling is performed on MAC-d (medium access control) PDUs (packet data unit). A number of MAC-d PDUs are provided as one MAC-hs PDU as a result of the scheduling decision. The voice packets are encapsulated in MAC-d PDUs, typically one MAC-d PDU per voice packet is used. The MAC-d PDUs are encapsulated in MAC-hs PDUs. The scheduler decides when to send the data, depending on load conditions, radio conditions and implementation, the scheduler can either decide to send one MAC-d PDU per MAC-hs PDU or wait and include many MAC-d PDUs per MAC-hs PDU. The MAC-hs is the lowest protocol layer over the radio link.

A delay scheduler can be used in a VoIP over HSPA. The delay scheduler uses an amount of time that a MAC-d PDU has been kept in a scheduling queue as an input parameter in the scheduling decision. Since real-time services like VoIP usually have a maximum tolerable end-to-end delay, the delay scheduler should be equipped with a maximum delay threshold. This maximum threshold would be used to discard the MAC-d PDUs that has been kept in the scheduling queue for a time that exceeds the maximum delay threshold.

Figure 8:
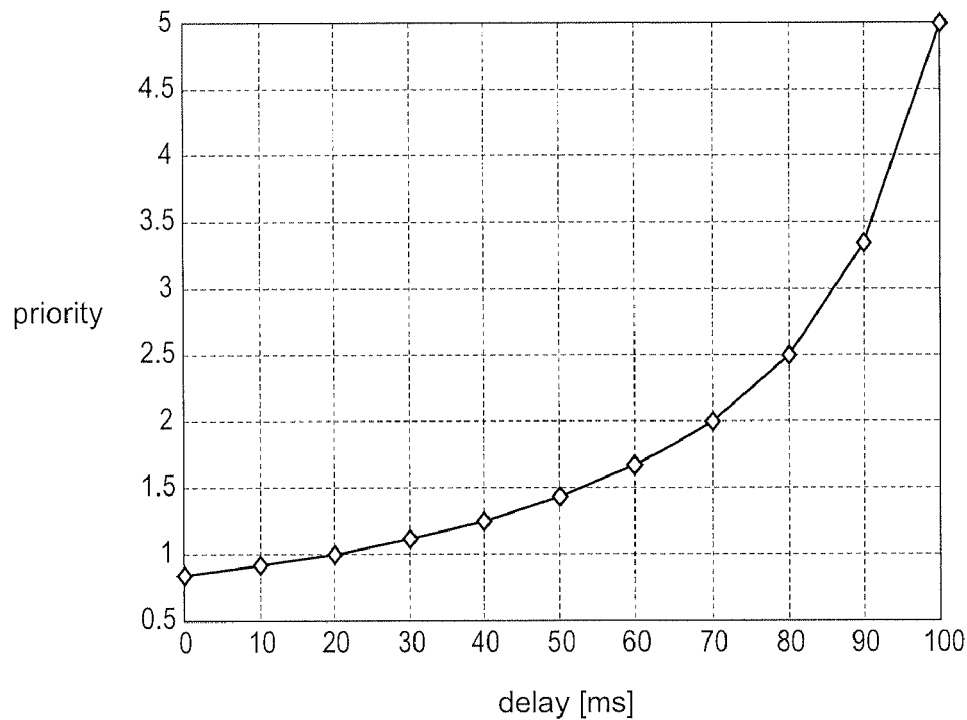
FIG. 8 illustrates an example priority function implemented in a base station scheduler.

FIG. 8 illustrates an example of a priority function that can be implemented in the delay scheduler. In this illustration, it is assumed that the maximum scheduling delay is 100 ms. Any MAC-d PDU that has been in the queue beyond 100 ms is discarded. Within 100 ms however, the priorities of the PDUs increase as the amount of time the PDU is in the queue increases. If the maximum threshold also takes H-ARQ (Hybrid Automatic Repeat Request) retransmissions into account (i.e., MAC-d PDUs are discarded even if they are in the process of being retransmitted), the delay due to scheduling and H-ARQ retransmissions can vary between 0 ms up to the maximum delay set by the maximum threshold.

Figure 9:
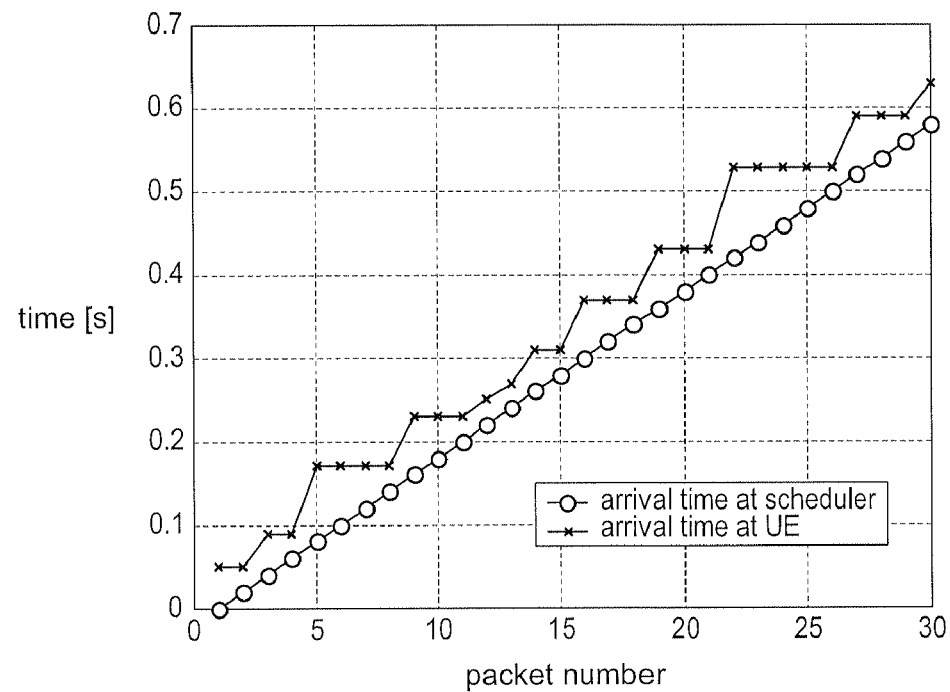
FIG. 9 illustrates an example of packet arrival times at a base station scheduler and the corresponding packet arrival time at the mobile wireless terminal.
Figure 10:
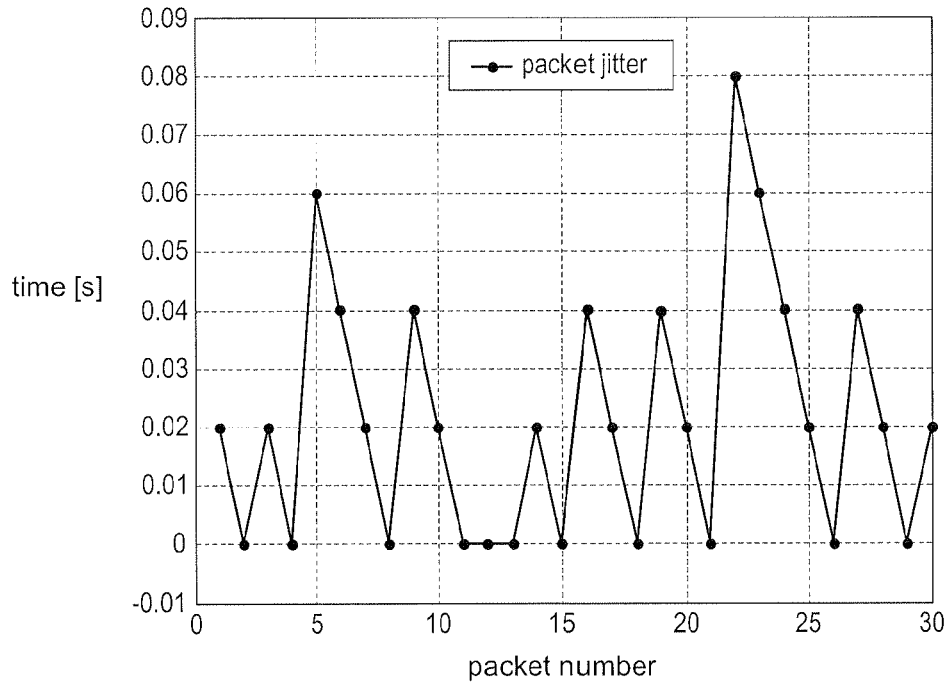
FIG. 10 illustrates an example jitter that occurs at a mobile wireless terminal.

However, the knowledge about the maximum scheduling threshold is not known to the mobile wireless terminals in conventional systems. Such knowledge of the maximum scheduling threshold would be beneficial in the implementation of the jitter buffer. For explanation purposes, FIGS. 7 and 8 are again referenced. In these Figures, it is assumed that each VoIP packet includes 20 ms of speech data. Thus, anywhere from 1 to 5 VoIP packets may be scheduled. Given a random scheduling between 1 and 5 VoIP packets, the packet arrival time at the base station (no jitter) and the mobile wireless terminal (jitter introduced by scheduling) may look as in FIG. 9. The jitter experienced by the mobile wireless terminal is also illustrated in FIG. 10.

In VoIP systems, there is a trade-off between reducing the number of lost packets and minimizing end-to-end delays when dealing with jitters. Increasing the jitter buffer on the mobile wireless terminal reduces the likelihood of lost packets, but increases the end-to-end delay. On the other hand, decreasing the jitter buffer shortens the end-to-end delay, which enhances the quality of the voice communication experience, but there is a greater likelihood of retransmissions and dropped packets. An optimum solution can be arrived if the jitter buffer size on the mobile wireless terminal can be matched to the scheduling delay. This is difficult to achieve in conventional systems since the scheduling delay introduced at the base station is unknown to the mobile wireless terminal. Thus, constant adjustments are required.

One way to overcome this problem is to apprise the mobile wireless terminal of the maximum scheduling delay. If the maximum scheduling delay is made known to the mobile wireless terminal, then the mobile wireless terminal may take action to allocate an amount of jitter buffer space sufficient to handle the maximum scheduling delay so that the number of dropped or retransmitted packets is minimized. It also preferred that the amount of allocated space be no more than what is required to handle the maximum scheduling delay. In this way, the end-to-end delay is also minimized.

Figure 1:
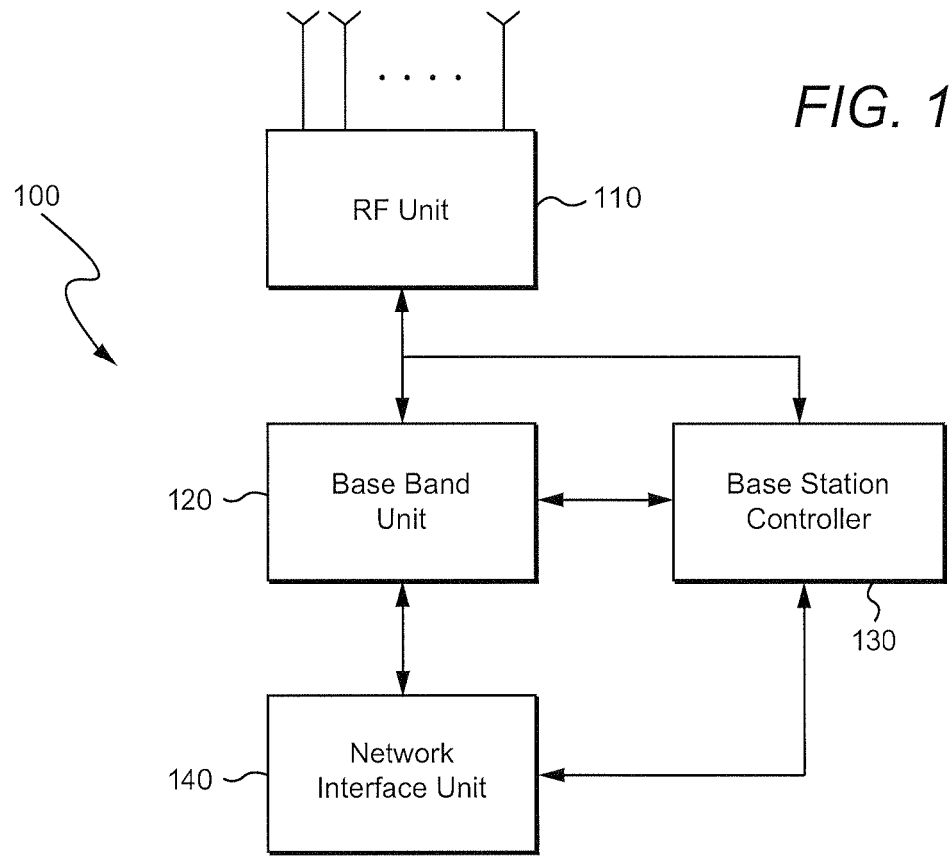
FIG. 1 illustrates an example embodiment of a base station used to communicate with mobile wireless terminals.

FIG. 1 illustrates an embodiment of a base station 100 capable of performing VoIP over a mobile broadband network, such as HSPA or EDGE. The base station 100 includes a RF (radio frequency) unit 110, a base band unit 120, a base station controller 130, and a network interface unit 140. The RF unit 110 is configured to provide VoIP packets to a plurality of mobile wireless terminals 200 (such as the user equipment illustrated in FIG. 2). The mobile wireless terminals are also referred to as mobile wireless terminals 200. A base band unit 120 is operatively coupled to the RF unit 110 and is configured to provide the VoIP signals to the RF unit 110 to communicate with the plurality of mobile wireless terminals 200. The base station controller 130 controls the operations of the RF unit 110 and the base band unit 120, as well as the network interface unit 140.

FIG. 4 illustrates an example method 400 of reducing jitter for VoIP over mobile broadband. The base band unit 120, the RF unit 110, and the network interface 140 may perform the method 400 under the control of the base station controller 130. As illustrated in FIG. 4, the method 400 includes establishing a communication between the base station 100 and the mobile wireless terminal 200 (act 410). For the mobile wireless terminal 200, a maximum scheduling delay is determined (act 420) and an indication of the maximum scheduling delay is provided to the mobile wireless terminal 200 (act 430). The maximum scheduling delay can be determined by the base station 100 (such as by the base band unit 120). However, a core network (not shown), to which the base station 100 is connected, can determine the maximum scheduling delay applicable to the mobile wireless terminal 200. After the maximum scheduling delay indication is provided, the base station 100 transmits, (i.e. provides) the VoIP packets to the mobile wireless terminal 200 (act 440).

Figure 2:
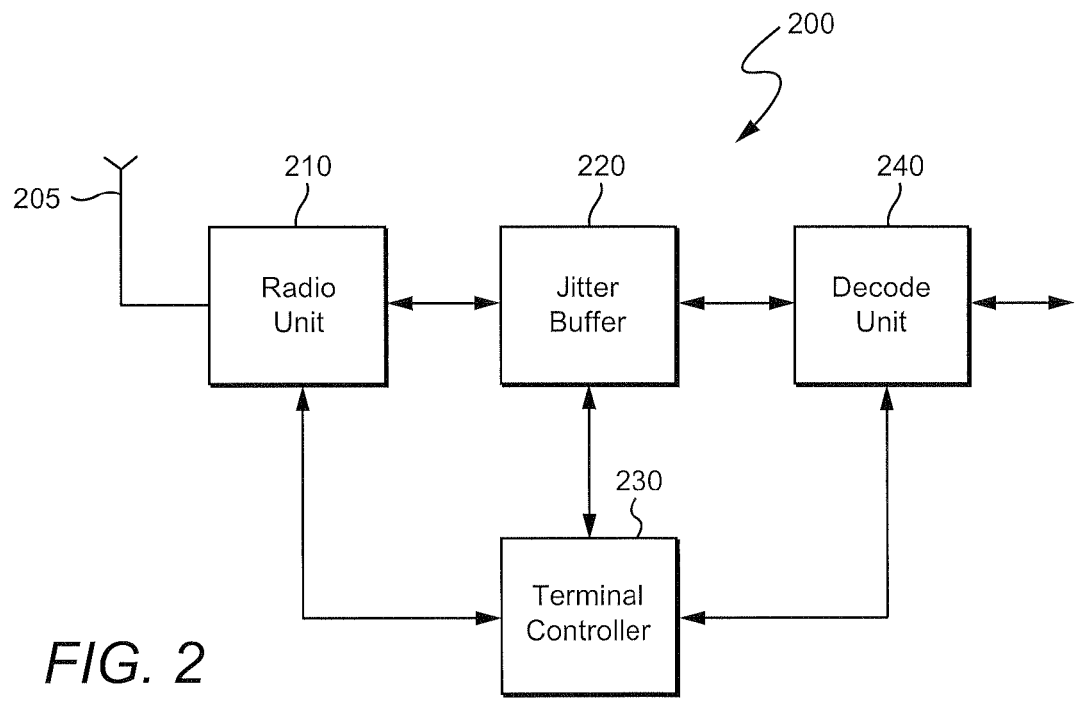
FIG. 2 illustrates an embodiment of a mobile wireless terminal.

FIG. 2 illustrates an example embodiment of the mobile wireless terminal 200. The mobile wireless terminal 200 includes a radio unit 210, a jitter buffer 220, and a decode unit 240 all operating under the control of the terminal controller 230. The radio unit 210 is configured to receive the VoIP packets from base station 100. The jitter buffer 220, which is operatively coupled to the radio unit 210, buffers the VoIP packets from the base station 100 received by the radio unit 210. The decode unit 240 decodes the VoIP packets that are buffered in the jitter buffer 220.

Figure 3:
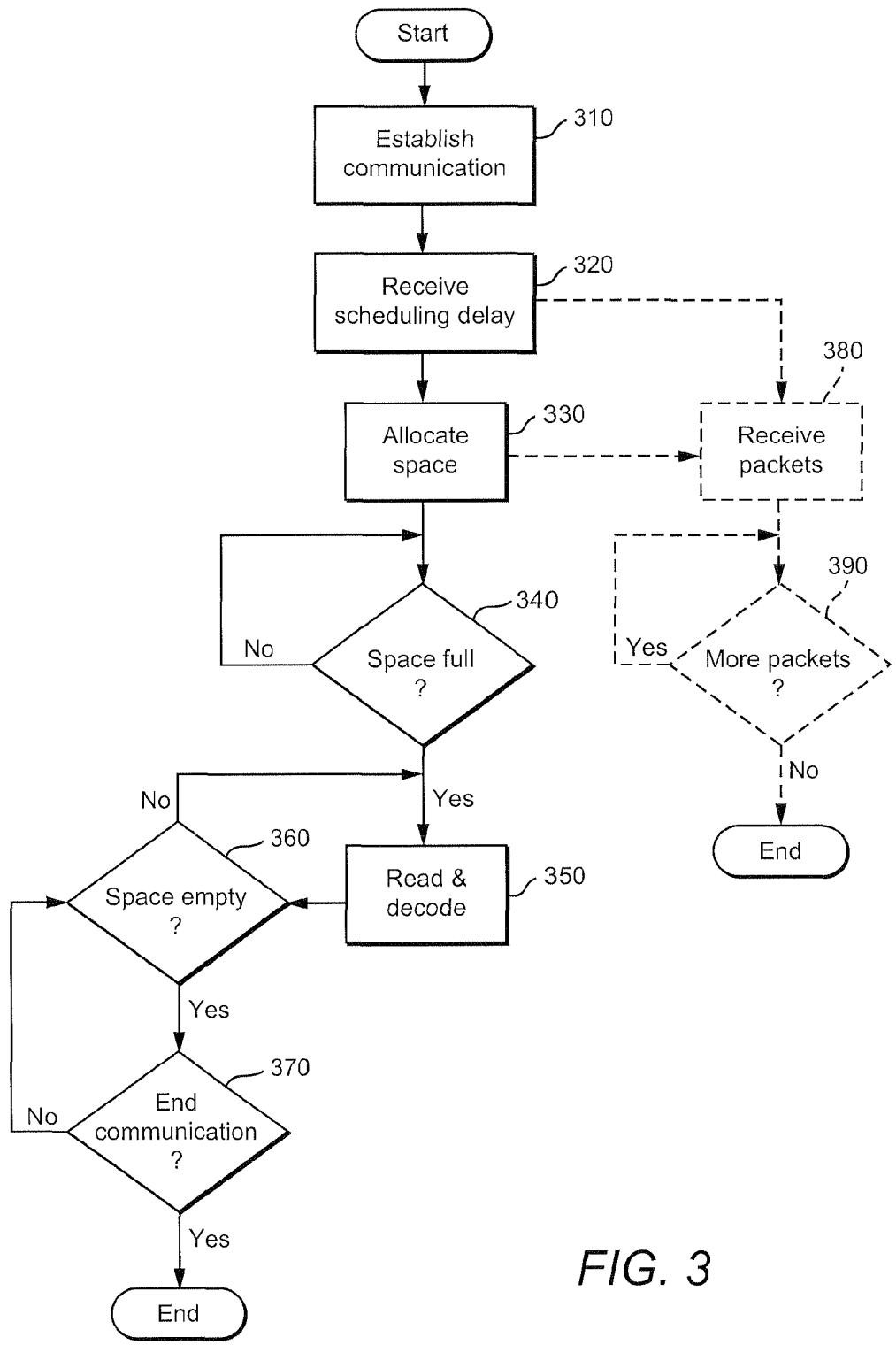
FIG. 3 illustrates an example method, performed by a mobile wireless terminal, of reducing jitter for VoIP over mobile broadband.

FIGS. 3 and 3A illustrate an example method performed by the mobile wireless terminal 200 to reduce jitter. The method begins by establishing a communication between the base station 100 and the mobile wireless terminal 200 (act 310). After the communication is established, a maximum scheduling delay indication from the base station 100 is received by the mobile wireless terminal 200, for example, by the radio unit 210, in act 320. In act 330, an amount of buffer space in the jitter buffer 220 sufficient to handle the maximum scheduling delay is allocated, for example by the terminal controller 230.

Referring back to FIG. 4, the base station 100 continually provides the VoIP packets after providing the scheduling delay in act 440. The VoIP packets are continually provided to the mobile wireless terminal 200 until the end of communication. Correspondingly, in the mobile wireless terminal 200, after receiving the scheduling delay in act 320, the VoIP packets are continually received in acts 380 and 390. Receiving the VoIP packets may take place immediately after receiving the scheduling delay in act 320 or after allocating the buffer space in act 330.

In an example, the initial decoding of the VoIP packets in the jitter buffer 220 does not begin until the allocated space is full as indicated in act 340. This initial triggering of the decoding process may be expressed by the following pseudo code:

if allocated_buffer_space_is_full
   decoding_started=1;
end

In this embodiment, the mobile wireless terminal 200 is informed of the maximum scheduling delay—i.e. either an amount of time or an amount of data (which can be expressed as a number of packets)—applicable to the mobile wireless terminal 200. This information may be provided to the mobile wireless terminal 200 in the QoS negotiation (PDP context set-up). The transfer delay attribute in 3GPP TS23.107 or a new delay attribute may be used to convey the information of the maximum scheduling delay. The transfer delay is typically defined as a maximum delay for 95th percentile of the distribution of delay for all delivered SDUs (Service Data Units) during a lifetime of a bearer service, where delay for an SDU is defined as the time from a request to transfer an SDU at one SAP (Service Access Point) to its delivery at the other SAP.

Figure 11:
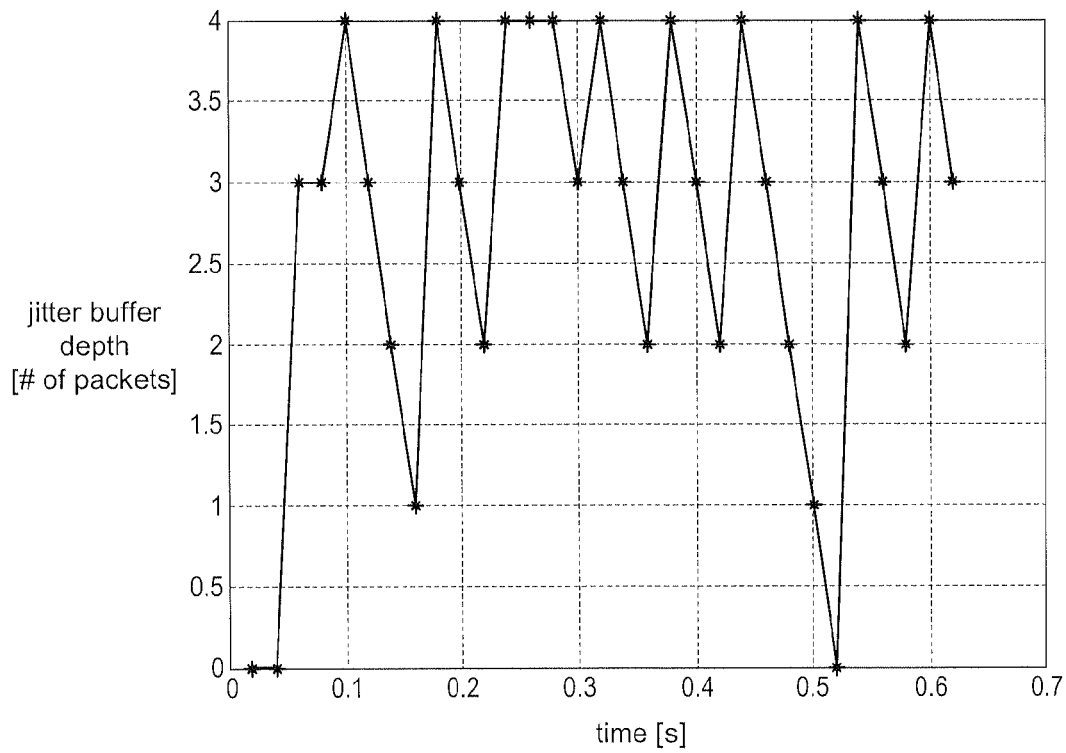
FIG. 11 illustrates an example jitter buffer depth as a function of time applying one or more disclosed principles.

In FIG. 3, the initial reading and decoding of the VoIP packets does not begin until the allocated space is full (see acts 340 and 350). By insuring that the decoding does not start until the allocated space is full for the first time after the communication is established, the mobile wireless terminal 200 can effectively handle the jitter. FIG. 11 illustrates how the mobile wireless terminal 200 handles the delay and the jitter trace illustrated in FIGS. 9 and 10. More specifically, FIG. 11 illustrates the jitter buffer depth as a function of time applying the algorithm as illustrated in FIG. 3. As can be seen, the play out without interruptions is insured. The strategy illustrated in FIG. 3 is optimized in a sense that the jitter buffer depth after decoding may go down to zero packets, i.e., it works with the smallest possible jitter buffer delay and thus end-to-end delay is minimized. After the initial decoding is started, the reading of the allocated jitter buffer space and decoding continues until the communication is ended (acts 360 and 370).

Figure 4A:
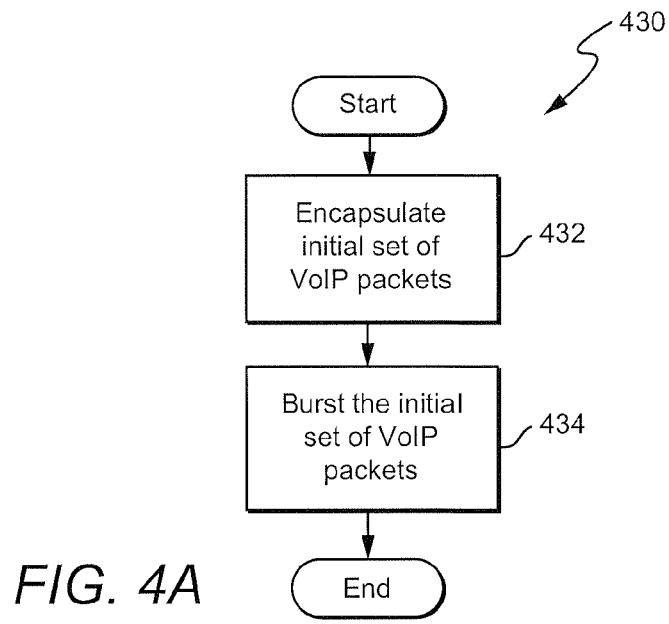
FIG. 4A illustrates an example method to encapsulate VoIP packets into an initial burst packet to indicate a maximum scheduling delay.
Figure 4B:
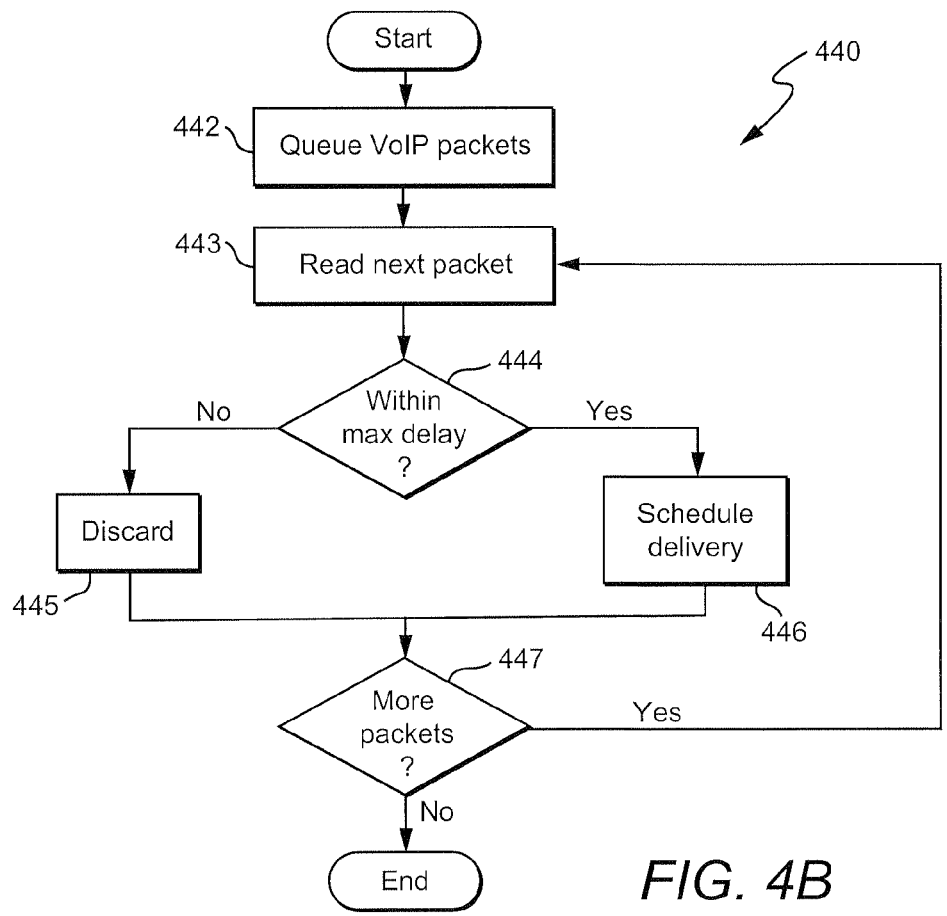
FIG. 4B illustrates an example method for providing VoIP packets from the base station to the mobile wireless terminal.
Figure 5:
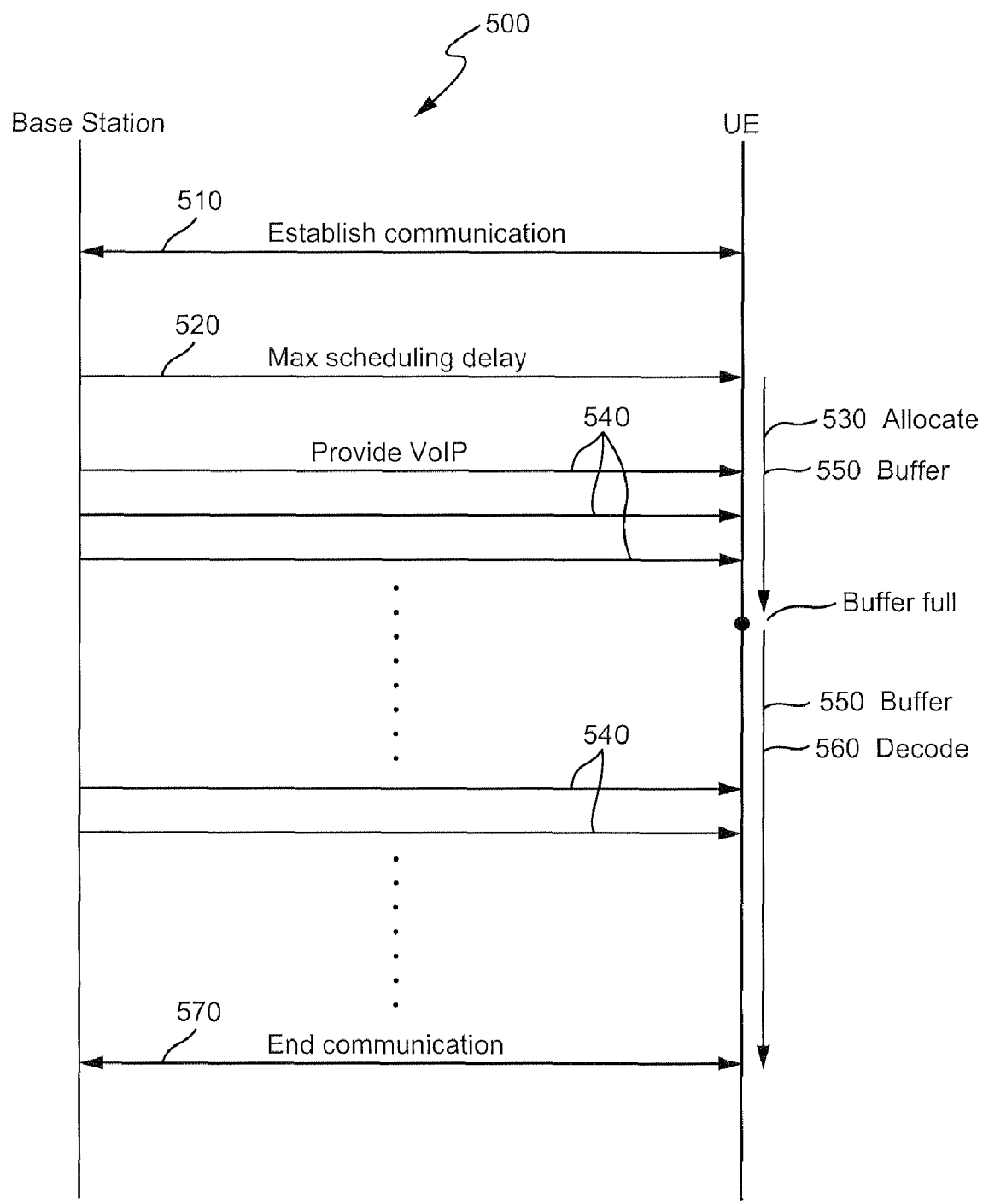
FIG. 5 illustrates a timeline of a communication method between the base station and the mobile wireless terminals.

The interplay between the base station 100 and the mobile wireless terminal 200 is illustrated in FIG. 5, which is a timeline of events between the base station 100 and the mobile wireless terminal 200. As shown, communication is established between the base station 100 and the mobile wireless terminal 200 in act 510. In act 520, the maximum scheduling delay is provided from the base station 100 to the mobile wireless terminal 200. This corresponds to act 420 in FIG. 4 and act 320 in FIG. 3. After providing the maximum scheduling delay, the base station 100 continually provides the VoIP packets to the mobile wireless terminal 200 (acts 540) until the communication between the base station 100 and the mobile wireless terminal 200 is ended (act 570).

On the mobile wireless terminal 200 side, after receiving the maximum scheduling delay in act 520, the jitter buffer space is allocated in act 530 and the VoIP packets provided in acts 540 are buffered in acts 550. Once the buffer becomes initially full, then the VoIP packets are continually decoded in act 560. The buffering and decoding acts 550 and 560 are performed as long as the VoIP packets are provided in acts 540. That is, once the decoding process is started, the decoding continues without regard to whether or not the allocated buffer space is full.

Referring back to FIG. 3, the maximum scheduling delay is received from the base station 100 to the mobile wireless terminal 200 in act 320. The maximum scheduling delay indication can be provided explicitly, separate from the actual VoIP packets. As an example, an amount of time may be indicated such as 100 ms. As another example, an amount of data may be indicated. The amount of data may be in terms of a number of bytes or an equivalent number of packets. In act 330 of allocating the buffer space, if the maximum scheduling delay indication is provided as an amount of time, the terminal controller 230 will allocate enough buffer space to buffer the amount of data corresponding to the amount of time. If the indication is provided in the form of an amount of data, the terminal controller 230 would again allocate the corresponding amount of buffer space.

The maximum scheduling delay indication may also be provided implicitly. It is indicated above that a number of MAC-d PDUs may be included in a single MAC-hs PDU. To state it another way, multiple VoIP packets may be packaged into a predetermined packet. The predetermined packet can be an initial burst packet. One or more VoIP packets are encapsulated into a single mobile broadband data packet and the mobile broadband data packet may be transmitted as an initial burst packet from the base station 100 to the mobile wireless terminal 200. The amount of VoIP packets encapsulated in the initial burst packet can be used to indicate the maximum scheduling delay for the mobile wireless terminal 200. This is illustrated in FIG. 4A, which illustrates an example method to implement act 430 of providing the scheduling delay. In this method, an initial set of VoIP packets are encapsulated into an initial burst packet in act 432 and the initial burst packet is transmitted in a burst in act 434. Correspondingly, in acts 320 and 330 of FIG. 3, the terminal controller 230 will allocate enough buffer space to buffer the initially received VoIP packets encapsulated in the burst data packet.

Figure 3B:
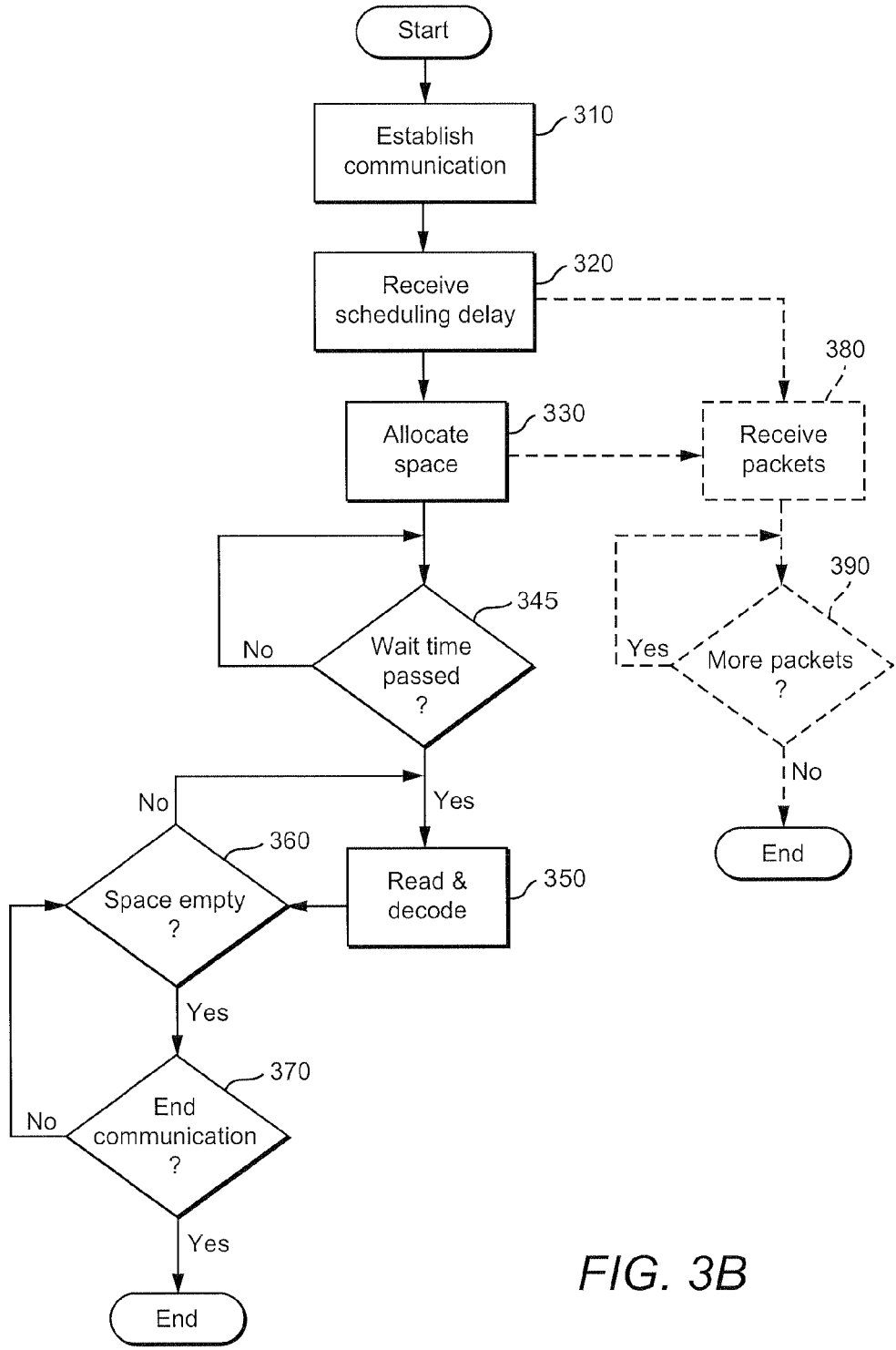
FIG. 3B illustrates a variation of the method illustrated in FIG. 3.
Figure 5A:
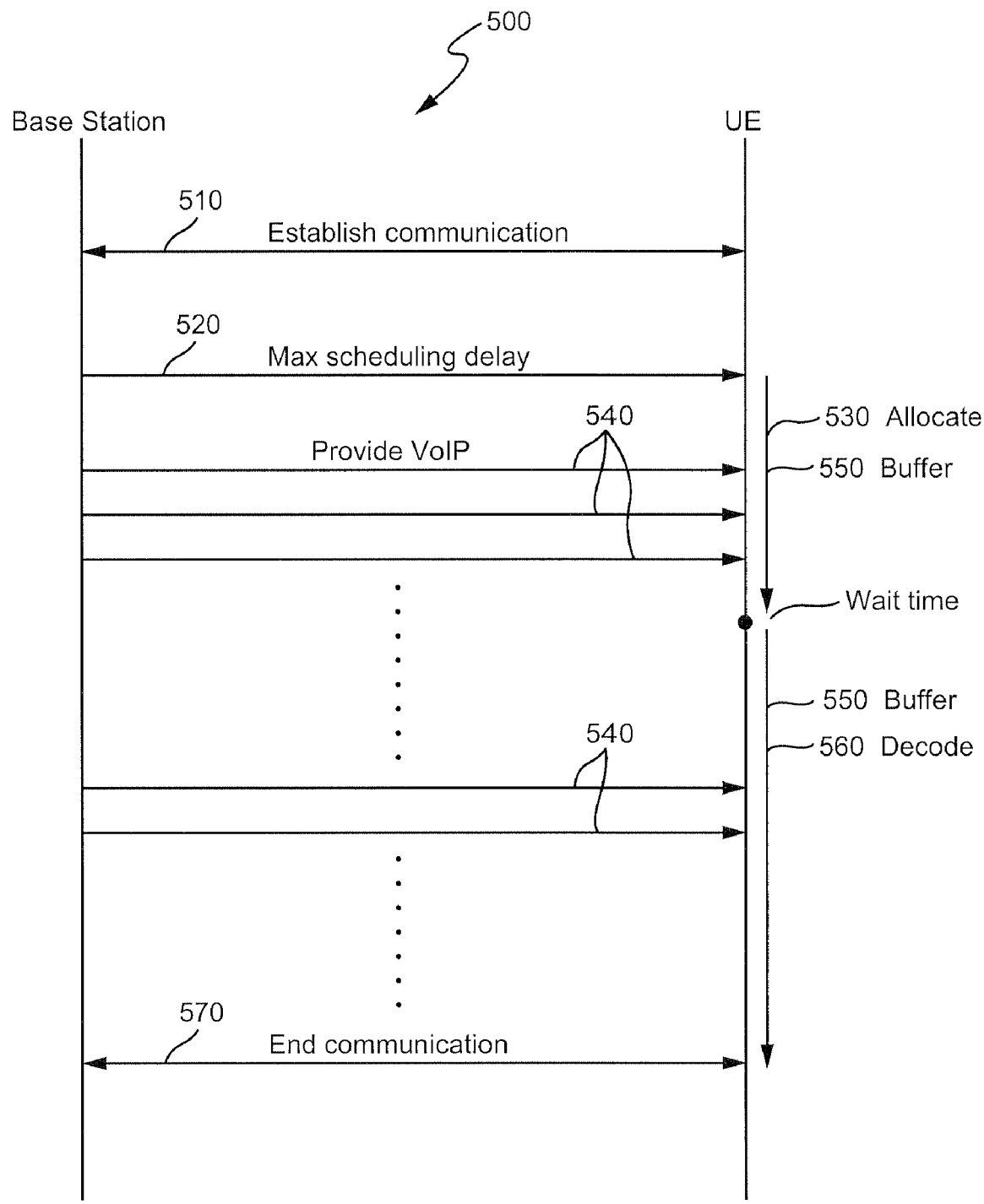
FIG. 5A illustrates a variation to the timeline illustrated in FIG. 5.

In FIG. 3, the decoding process does not begin until the allocated buffer is initially full. FIG. 3B illustrates a variation of the method and FIG. 5A illustrates corresponding time line events. In FIG. 3B, the decision made in act 340 is replaced by act 345. In act 345, it is determined whether a wait time has passed since the communication has been established with the base station 100. The decoding process (act 350) begins after the wait time has passed. In an embodiment, the wait time corresponds to the maximum scheduling delay received in act 320. This initial triggering of the decoding process may be expressed by the following pseudo code:

if wait_time_passed
   decoding_started=1;
end

Note that voice packets other than the initial packets may also be encapsulated and provided as burst packets from the base station 100 to the mobile wireless terminal 200. When such packets are received on the mobile wireless terminal 200 side, the packets are unencapsulated into individual VoIP packets and the unencapsulated VoIP packets are provided to the buffer space as illustrated in FIG. 3A (acts 382, 384 and 386).

The ability to burst the packets aids in scheduling the delivery of the packets to the plurality of mobile wireless terminals 200. The scheduling can be accomplished by any of the network components including the base station 100 itself. This is illustrated in FIG. 4B which exemplifies one way to provide the VoIP packets to the mobile wireless terminals 200. A network delay scheduler, which may be implemented in the base station controller 130, may perform this method. The method of scheduling and providing the VoIP packets begins by queuing the VoIP packets destined to a mobile wireless terminal 200 in act 442. From the queue in act 443, the next packet for the mobile wireless terminal 200 is read. If the packet is within the maximum delay, the packet is scheduled for delivery (acts 444 and 446). Otherwise, the packet is discarded (act 445). The process is repeated as long as there are packets in the queue (act 447). A delivery of multiple VoIP packets can take place in a burst by encapsulating the multiple VoIP packets into a single burst data packet as described above.

It may not always be feasible to explicitly convey the information about the maximum scheduling delay to the mobile wireless terminal 200. For example, some mobile wireless terminals 200 may not have the capability to receive such information. These types of mobile wireless terminals 200 may be configured such that the decoding starts as soon as there are VoIP packets in the jitter buffer 220. In other words, the mobile wireless terminal 200 decoding process can be represented by the following pseudo code.

if packets_in_jitter_buffer >=0,
   decoding_started=1;
end

Figure 12:
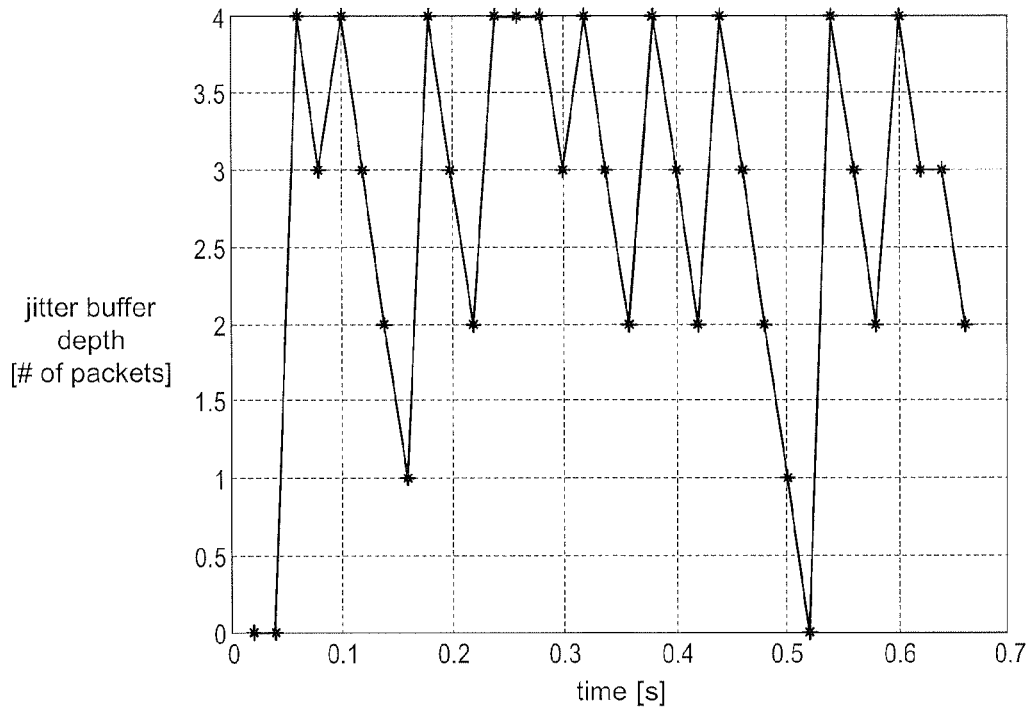
FIG. 12 illustrates an alternative example jitter buffer depth as a function of time applying one or more disclosed principles.
Figure 14:
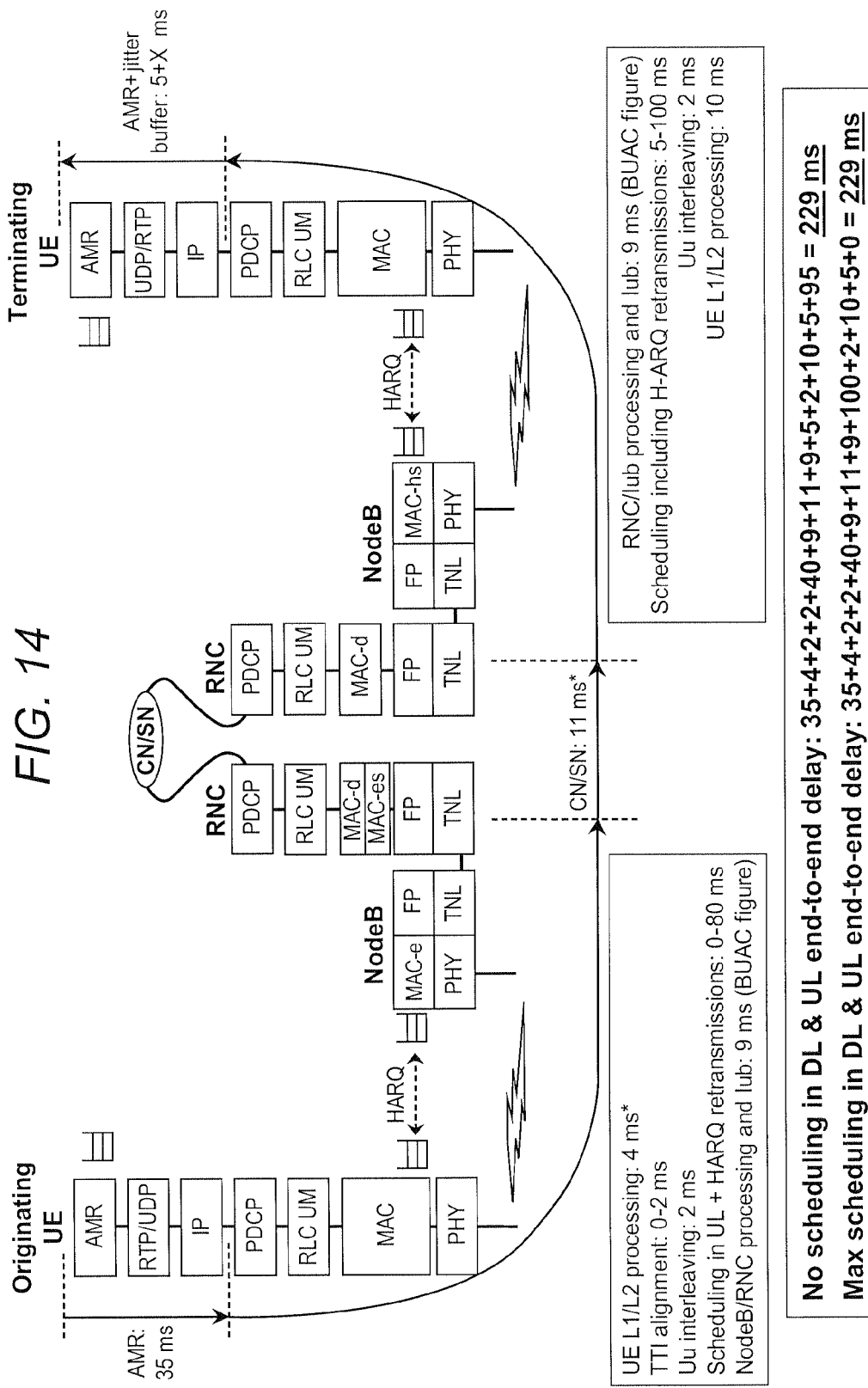
FIG. 14 illustrates an end-to-end delay of a VoIP over HSPA system with particular matching scheduling delays applying one or more disclosed principles.

In this instance, the mobile wireless terminal 200 starts to decode as fast as the VoIP packet is received. The intelligence to guarantee speech playout without interruptions is moved to the network side, for example, to the base station 100. Note that the intelligence may be built into any network side component, not just the base station 100. One advantage of this embodiment is that the algorithm utilized by the network (e.g., the base station 100) is simplified. The base station 100 starts the transmission by bursting an amount of VoIP data equivalent to the maximum scheduling delay associated with the mobile wireless terminal 200. FIG. 12 illustrates what happens when the delay traces from FIGS. 9 and 10 are modified to start with a transmission of 5 packets and applying the buffer strategy represented by the above pseudo code. Again, the buffer depth may reach zero.

This is in contrast to FIG. 13 which illustrates a conventional computer buffer allocation strategy in which the amount of computer buffer exceeds what is required. In FIG. 13, the VoIP packets is never emptied (never reaches zero), which indicates that the end-to-end delay is longer than necessary. Note that FIG. 13 is also to be contrasted with FIG. 11.

Figure 6:
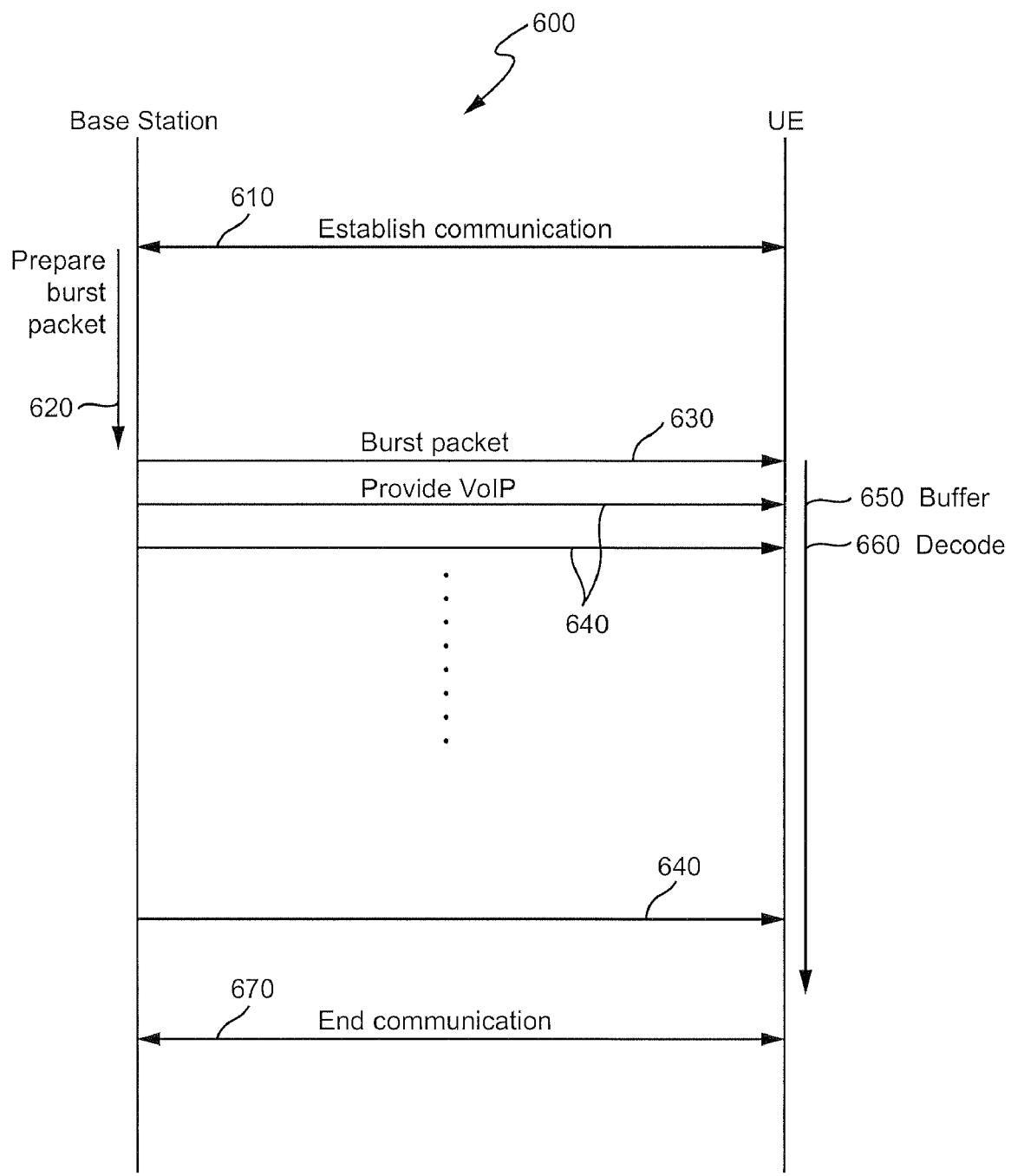
FIG. 6 illustrates an alternative embodiment of a timeline for communications between the base station and the mobile wireless terminals.

The timeline for this alternate strategy is illustrated in FIG. 6. In FIG. 6, the communication between the base station 100 and the mobile wireless terminal 200 is established in act 610. Also, a burst data packet, which encapsulates one or more VoIP packets, is prepared by the base station 100 in act 620. Once prepared, the burst packet is provided to the mobile wireless terminal 200 in act 630. After the initial packet is provided, the base station 100 continually provides the remainder of the VoIP packets to the mobile wireless terminal 200 in acts 640 until the communication is ended in act 670. Note that the remainder of the VoIP packets may also be provided to the mobile wireless terminal 200 encapsulated into one or more other burst packets.

On the mobile wireless terminal 200 side, as soon as the VoIP packets are provided from the base station 100, the packets are buffered and decoded (acts 650 and 660) until the communication ends between the base station 100 and the mobile wireless terminal 200.

As mentioned above, one form of a mobile broadband system in which the VoIP may be implanted is HSPA. Another is implementing the VoIP over EDGE. When using HSPA, dynamic frame bundling is possible. That is, the number of speech frames for transmission between the base station 100 and the mobile wireless terminal 200 can be varied. Dynamic frame bundling is not likely in the VoIP over EDGE implementation because the mobile wireless terminal 200 is normally scheduled a regular time slot in EDGE, for example, once every 20 milliseconds. Retransmissions are beneficial to receive sufficiently low FER (Frame Erasure Rate) for the voice service. However, significant jitter is created if such retransmissions are allowed.

One possible optimization proposed in the GSM EDGE Continued Evolution standardization is non-persistent scheduling where there are a maximum number of retransmissions before the packet is discarded. The maximum amount of jitter that can be created in VoIP over EDGE system will then be a time in which a packet is retransmitted. Thus, an additional feature of the delay attribute than can be factored in is that the delay attribute carries a time that a packet can be retransmitted in the VoIP over EDGE system.

While described with reference to the example embodiments thereof, those skilled in the art will be able to make various modifications to the described embodiments. The terms and descriptions used herein are set forth by way of illustration only and are not meant as limitations. In particular, although the method has been described by examples, the acts of the method may be performed in a different order than illustrated or simultaneously. Those skilled in the art will recognize that these and other variations are possible.

What is claimed is:

1. A mobile wireless terminal capable of performing VoIP (Voice over Internet Protocol) over mobile broadband, comprising:
   a jitter buffer configured to buffer VoIP packets received from a base station over a radio interface;
   a terminal controller operatively coupled to the jitter buffer and configured to allocate an amount of buffer space in the jitter buffer sufficient for a maximum scheduling delay in the jitter buffer in accordance with a maximum scheduling delay indication associated with the mobile wireless terminal, the maximum scheduling delay indication being received from the base station over the radio interface; and
   a radio unit configured to receive the VoIP packets from the base station and configured to receive the maximum scheduling delay indication from the base station prior to receiving the VoIP packets, wherein the radio unit functions as the radio interface.

2. The mobile wireless terminal of claim 1, further comprising:
   a decode unit operatively coupled to the jitter buffer and configured to decode the VoIP packets buffered in the jitter buffer,
   wherein the terminal controller is operatively coupled to the radio unit and to the decode unit and is configured to control operations of the radio unit and the decode unit, and
   wherein the decode unit is configured to start decoding the VoIP packets from the jitter buffer once the allocated buffer space is full for a first time after communication with the base station is established.

3. The mobile wireless terminal of claim 2,
   wherein the maximum scheduling delay indication is received explicitly as one of an amount of time or an amount of data, and
   wherein the terminal controller is configured to allocate the buffer space in the jitter buffer corresponding to the amount of time or the amount of data.

4. A method of reducing jitter for VoIP (Voice over Internet Protocol) over mobile broadband performed by or on behalf of a mobile wireless terminal, the method comprising:
   receiving, over a radio interface, a maximum scheduling delay indication from a base station, the maximum scheduling delay indication corresponding to a maximum scheduling delay associated with the mobile wireless terminal;
   allocating an amount of buffer space in a jitter buffer of the mobile wireless terminal sufficient for the maximum scheduling delay; and
   receiving VoIP packets from the base station over the radio interface and storing the VoIP packets in the jitter buffer
   wherein the act of receiving the indication of the maximum scheduling delay indication occurs prior to the act of receiving the VoIP packets.

5. The method of claim 4, further comprising:
   determining whether the allocated buffer space is full; and
   starting a VoIP decoding process when it is determined, for a first time after establishing communication with the base station, that the allocated buffer space is full.

6. The method of claim 5,
   wherein the maximum scheduling delay indication is provided explicitly as one of an amount of time or an amount of data, and
   wherein the act of allocating the amount of buffer space in the jitter buffer of the mobile wireless terminal comprises allocating the buffer space in the jitter buffer corresponding to the amount of time or the amount of data.

7. A base station capable of performing VoIP (Voice over Internet Protocol) over mobile broadband, comprising:
   a base band unit configured to communicate with a plurality of mobile wireless terminals via a radio interface; and a base station controller operatively coupled to the base band unit and configured to control operations of the base band unit, wherein, for a mobile wireless terminal among the plurality of mobile wireless terminals, the base band unit is configured to:
- establish communication with the mobile wireless terminal;
- determine a maximum scheduling delay applicable to the mobile wireless terminal after establishing the communication with the mobile wireless terminal;
- provide, via the radio interface, a maximum scheduling delay indication to the mobile wireless terminal, wherein the maximum scheduling delay indication corresponds to the maximum scheduling delay applicable to the mobile wireless terminal; and
- provide, via the radio interface, the VoIP packets destined for the mobile wireless terminal.

8. The base station of claim 7, wherein the maximum scheduling delay indication is an explicit indication specifying one of an amount of time or an amount of data.

9. The base station of claim 7, wherein the base band unit is configured to provide the maximum scheduling delay indication prior to providing the VoIP packets.

10. The base station of claim 7, wherein the base band unit is configured to:
- package a predetermined packet, the predetermined packet including VoIP data, and
- provide the predetermined packet to the mobile wireless terminal, and
- wherein an amount of the VoIP data in the predetermined packet corresponds to the maximum scheduling delay.

11. The base station of claim 10, wherein the base band unit is configured to:
- encapsulate one or more VoIP packets into an initial burst packet, and
- burst the initial burst packet to the mobile wireless terminal prior to providing any other VoIP packets to the mobile wireless terminal, and
- wherein an amount of VoIP data in the initial burst packet is an implicit maximum scheduling delay indication.

12. The base station of claim 7, wherein the base band unit is configured to:
- queue the VoIP packets destined to the mobile wireless terminal;
- for each queued VoIP packet, determine whether the VoIP packet can be delivered to the mobile wireless terminal within the maximum scheduling delay based on a priority;
- schedule a delivery of each VoIP packet that can be delivered within the maximum scheduling delay; and
- discard each VoIP packet that cannot be delivered within the maximum scheduling delay.

13. A method of reducing jitter for VoIP (Voice over Internet Protocol) over mobile broadband performed by or on behalf of a base station, the method comprising:
- establishing communication with a mobile wireless terminal over a radio interface;
- determining a maximum scheduling delay applicable to the mobile wireless terminal;
- providing, via the radio interface, a maximum scheduling delay indication to the mobile wireless terminal, wherein the maximum scheduling delay indication is the maximum scheduling delay applicable to the mobile wireless terminal; and
- providing, via the radio interface, VoIP packets destined for the mobile wireless terminal.

14. The method of claim 13, wherein the act of providing the maximum scheduling delay indication comprises explicitly providing the maximum scheduling delay indication as one of an amount of time or an amount of data.

15. The method of claim 13, wherein the act of providing the maximum scheduling delay indication to the mobile wireless terminal is performed prior to the act of providing the VoIP packets destined for the mobile wireless terminal.

16. The method of claim 13, wherein the act of providing the maximum scheduling delay indication comprises:
- packaging VoIP data into a predetermined packet; and
- providing the predetermined packet to the mobile wireless terminal,
- wherein an amount of the VoIP data in the predetermined packet corresponds to the maximum scheduling delay indication.

17. The method of claim 16, wherein the act of providing the VoIP data into the predetermined packet and the act of providing the predetermined packet to the mobile wireless terminal comprise:
- encapsulating one or more VoIP packets into an initial burst packet corresponding; and
- bursting the initial burst packet to the mobile wireless terminal,
- wherein the initial burst packet is the predetermined packet.

18. The method of claim 13, wherein the act of providing the VoIP packets destined for the mobile wireless terminal comprises:
- queuing the VoIP packets destined to the mobile wireless terminal;
- for each queued VoIP packet, determining whether the VoIP packet can be delivered to the mobile wireless terminal within the maximum scheduling delay based on a priority;
- scheduling a delivery of each VoIP packet that can be delivered within the maximum scheduling delay; and
- discarding each VoIP packet that cannot be delivered within the maximum scheduling delay.

19. A method of reducing jitter for VoIP (Voice over Internet Protocol) over mobile broadband, the method comprising:
- establishing communication between a base station and a mobile wireless terminal over a radio interface;
- determining, at the base station, a maximum scheduling delay applicable to the mobile wireless terminal;
- preparing an initial burst packet at the base station, the initial burst packet having encapsulated therein one or more initial VoIP packets, wherein an amount of VoIP data in the initial burst packet corresponds to the maximum scheduling delay applicable to the mobile wireless terminal;
- bursting to the mobile wireless terminal from the base station the initial burst packet prior to providing any other VoIP packets after establishing the communication between the base station and the mobile wireless terminal;
- providing to the mobile wireless terminal from the base station remainder of the VoIP packets; and
- decoding at the mobile wireless terminal the one or more initial VoIP packets and the remainder of the VoIP packets,
- wherein the act of decoding starts as soon as the mobile wireless terminal receives the VoIP data without regard to whether or not a jitter buffer of the mobile wireless terminal is full.

20. The mobile wireless terminal of claim 1, further comprising:
a decode unit operatively coupled to the jitter buffer and configured to decode the VoIP packets buffered in the jitter buffer,
wherein the terminal controller operatively is coupled to the radio unit and the decode unit and configured to control operations of the radio unit and the decode unit, and
wherein the decode unit is configured to start decoding the VoIP packets from the jitter buffer after a wait time passes since communication with the base station is established.

21. The mobile wireless terminal of claim 20, wherein the wait time corresponds to the maximum scheduling delay.

22. The method of claim 4, further comprising:
determining whether a wait time has passed since establishing the communication with the base station; and
starting the VoIP decoding process after the wait time has passed.

23. The method of claim 22, wherein the wait time corresponds to the maximum scheduling delay.

24. The base station of claim 12, wherein the priority for each VoIP is based on a subscriber service level associated with the mobile wireless terminal and an origination time of the VoIP.

25. A mobile wireless terminal capable of performing VoIP (Voice over Internet Protocol) over mobile broadband, comprising:
a radio unit configured to establish communication with the base station, receive a maximum scheduling delay indication from the base station, and receive VoIP packets from the base station;
a jitter buffer operatively coupled to the radio unit and configured to buffer the VoIP packets received from the base station;
a decode unit operatively coupled to the jitter buffer and configured to decode the VoIP packets buffered in the jitter buffer;
a terminal controller operatively coupled to and control operations of the radio unit, the jitter buffer and the decode unit,
wherein the terminal controller is configured to allocate an amount of buffer space in the jitter buffer sufficient for the maximum scheduling delay in accordance with the maximum scheduling delay indication received from the base station, and
wherein the decode unit is configured to start decoding the VoIP packets from the jitter buffer once the allocated buffer space is full for a first time after the communication with the base station is established.

26. The mobile wireless terminal of claim 25,
wherein the maximum scheduling delay indication is received explicitly as one of an amount of time or an amount of data, and
wherein the terminal controller is configured to allocate the buffer space corresponding to the amount of time when the maximum scheduling delay indication is received as the amount of time, and allocate the buffer space corresponding to the amount of data when the maximum scheduling delay indication is received as the amount of data.

27. The mobile wireless terminal of claim 25, wherein the radio unit configured to receive the maximum scheduling delay indication prior to receiving the VoIP packets.

28. The mobile wireless terminal of claim 25,
wherein the radio unit is configured to receive a predetermined packet from the base station, the predetermined packet including VoIP data,
wherein an amount of the VoIP data in the predetermined packet corresponds to the maximum scheduling delay, and
wherein the terminal controller is configured to allocate the buffer space in the jitter buffer corresponding to the amount of the VoIP data in the predetermined packet.

29. The mobile wireless terminal of claim 28, wherein the radio unit is configured to:
receive one or more VoIP packets encapsulated in an initial burst packet from the base station, wherein the initial burst packet is the predetermined packet and is received prior to receiving any other VoIP packets;
encapsulate the initial burst packet into the one or more VoIP packets; and
provide the unencapsulated one or more VoIP packets to the jitter buffer.

30. The mobile wireless terminal of claim 28, wherein the buffer space is not adjusted for a duration of the communication.

31. A method of reducing jitter for VoIP (Voice over Internet Protocol) over mobile broadband performed by or on behalf of a mobile wireless terminal, the method comprising:
receiving, over a radio interface, a maximum scheduling delay indication from a base station, the maximum scheduling delay indication corresponding to a maximum scheduling delay associated with a mobile wireless terminal;
allocating an amount of buffer space in a jitter buffer of the mobile wireless terminal sufficient for the maximum scheduling delay;
receiving VoIP packets from the base station and storing the VoIP packets in the jitter buffer;
determining whether the allocated buffer space is full; and
starting a VoIP decoding process when it is determined, for a first time after establishing communication with the base station, that the allocated buffer space is full.

32. The method of claim 31,
wherein the maximum scheduling delay indication is provided explicitly as one of an amount of time or an amount of data, and
wherein the act of allocating the amount of buffer space in the terminal controller comprises allocating the buffer space corresponding to the amount of time when the maximum scheduling delay indication is received as the amount of time, and allocating the buffer space corresponding to the amount of data when the maximum scheduling delay indication is received as the amount of data.

33. The method of claim 31, wherein the act of receiving the indication of the maximum scheduling delay indication occurs prior to the act of receiving the VoIP packets.

34. The method of claim 31,
wherein the act of receiving the VoIP packets from the base station comprises receiving a predetermined packet from the base station, the predetermined packet including VoIP data,
wherein an amount of the VoIP data in the predetermined packet corresponds to the maximum scheduling delay, and
wherein the allocated buffer space in the jitter buffer corresponds to the amount of the VoIP data in the predetermined packet.

35. The method of claim 34, wherein the act of receiving the VoIP packets from the base station comprises:

receiving an initial burst packet from the base station prior to receiving any other VoIP packets, the initial burst packet being the predetermined packet and including one or more VoIP packets;

unencapsulating the one or more VoIP packets from the initial burst packet; and providing the unencapsulated one or more VoIP packets to the allocated buffer space.

36. The method of claim 31, wherein the buffer space is not adjusted for a duration of the communication.

\* \* \* \* \*